United States Patent
Kim et al.

(10) Patent No.: US 12,496,564 B2
(45) Date of Patent: Dec. 16, 2025

(54) DEHYDROGENATION REACTION APPARATUS AND SYSTEM INCLUDING THE SAME

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Pyung Soon Kim, Suwon-si (KR); Jin Woo Choung, Suwon-si (KR); Yongwoo Kim, Gunpo-si (KR); Jihui Seo, Ulsan (KR); Jaeyong Lee, Seongnam-si (KR); Yongmin Kim, Seoul (KR); Suk Woo Nam, Seoul (KR); Hyuntae Sohn, Seoul (KR); Hyangsoo Jeong, Seoul (KR); Dong Gyun Kang, Seoul (KR); Arash Badakhsh, Seoul (KR); Donghyun Song, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 678 days.

(21) Appl. No.: 17/972,698

(22) Filed: Oct. 25, 2022

(65) Prior Publication Data

US 2023/0294057 A1 Sep. 21, 2023

(30) Foreign Application Priority Data

Mar. 17, 2022 (KR) .......................... 10-2022-0033305

(51) Int. Cl.
*B01J 8/02* (2006.01)
*B01D 53/00* (2006.01)
*B01J 8/06* (2006.01)

(52) U.S. Cl.
CPC .......... *B01J 8/0285* (2013.01); *B01D 53/002* (2013.01); *B01J 8/0257* (2013.01); *B01J 8/067* (2013.01);
(Continued)

(58) Field of Classification Search
CPC .. B01D 53/00; B01D 53/002; B01D 2256/00; B01D 2256/16; B01J 8/00; B01J 8/001;
(Continued)

(56) References Cited

U.S. PATENT DOCUMENTS 10,618,808 B2 * 4/2020 Hornung .................. B01J 23/42
11,383,974 B2 * 7/2022 Bösmann ................. B01J 23/44

FOREIGN PATENT DOCUMENTS

WO WO-2019243073 A1 * 12/2019 ........... C01B 3/0015
WO WO-2020150248 A1 * 7/2020 ............. C07C 31/04

OTHER PUBLICATIONS

Jaesung Han et al., High Purity Generator for Fuel Cell Vehicles, J. of the Korean Hydrogen Energy society, vol. 12. No. 4(2001); 9pp.

* cited by examiner

*Primary Examiner* — Natasha E Young
(74) *Attorney, Agent, or Firm* — Lempia Summerfield Katz LLC

(57) ABSTRACT

A dehydrogenation reaction apparatus and a system including the same are disclosed. The dehydrogenation reaction apparatus includes: a main housing; and a dehydrogenation reactor which is provided inside of the main housing and has a catalyst provided inside. In particular, the dehydrogenation reactor generates hydrogen from a liquid organic hydrogen
(Continued)

carrier (LOHC). The dehydrogenation reaction apparatus further includes: a heating device provided inside of the main housing and configured to apply heat to the dehydrogenation reactor through a phase change material, where the phase change material is provided between the main housing, and the dehydrogenation reactor and the heating device.

18 Claims, 12 Drawing Sheets

(52) U.S. Cl.
CPC . *B01D 2256/16* (2013.01); *B01J 2208/00168* (2013.01); *B01J 2208/00415* (2013.01); *B01J 2208/00504* (2013.01); *B01J 2208/065* (2013.01)

(58) Field of Classification Search
CPC . B01J 8/02; B01J 8/0242; B01J 8/0257; B01J 8/0285; B01J 8/06; B01J 8/067; B01J 2208/00; B01J 2208/00008; B01J 2208/00017; B01J 2208/00106; B01J 2208/00168; B01J 2208/00389; B01J 2208/00415; B01J 2208/00504; B01J 2208/06; B01J 2208/065; C01B 3/00–0015; C01B 2203/00–0277; C01B 2203/0811; C01B 2203/0805; C01B 2203/1041; C01B 2203/1047; C01B 2203/1064; H01M 8/00; H01M 8/04; H01M 8/04007; H01M 8/4082; H01M 8/04201; H01M 8/04216; H01M 8/06; H01M 8/0606; H01M 8/065
See application file for complete search history.

DEHYDROGENATION REACTION APPARATUS AND SYSTEM INCLUDING THE SAME

CROSS-REFERENCE TO RELATED APPLICATION

This application claims priority to and the benefit of Korean Patent Application No. 10-2022-0033305, filed in the Korean Intellectual Property Office on Mar. 17, 2022, the entire contents of which are incorporated herein by reference.

BACKGROUND

(a) Field

The present disclosure relates to a dehydrogenation reaction apparatus. More particularly, the present disclosure relates to a dehydrogenation reaction apparatus capable of constantly maintaining a temperature of a dehydrogenation reactor, and a system including the same.

(b) Related Art

Due to the depletion of fossil energy and environmental pollution problems, hydrogen is attracting attention as renewable and alternative energy.

A fuel cell and a hydrogen combustion device use hydrogen as a reaction gas, and in order to apply the fuel cell and the hydrogen combustion device to vehicles and various electronic products, a technology for stable and continuous supply of hydrogen is desired.

In order to supply hydrogen to a device that uses hydrogen, a method of supplying hydrogen, whenever hydrogen is needed, from a separately installed hydrogen supply source may be used. In one form, compressed hydrogen or liquefied hydrogen may be used to store hydrogen.

Alternatively, a method of generating hydrogen through a reaction of a corresponding material after mounting a material in which hydrogen is stored on a device using hydrogen and supplying it to the device using hydrogen may be used. For this method, for example, a method of using a liquid organic hydrogen carrier (LOHC), a method using physical hydrogen storage, a method of using inorganic chemical-based hydrogen storage, and the like have been proposed.

However, dehydrogenation of the liquid organic hydrogen carrier is an endothermic reaction and requires a heat source to supply reaction heat. A system is known that generates heat by burning some of the hydrogen produced to supply the heat desired for the dehydrogenation reaction of the liquid organic hydrogen carrier without exhausting carbon dioxide.

In a case of providing heat of a dehydrogenation reaction of the liquid organic hydrogen carrier, in order to generate hydrogen rapidly, the temperature of a catalyst must be increased quickly, and since the dehydrogenation reaction is sensitive to temperature changes, it is desired to keep the temperature of the reactor constant.

The above information disclosed in this Background section is provided only to enhance understanding of the background of the present disclosure. Therefore, this Background section may contain information that does not form the prior art that is already known to a person of ordinary skill in the art.

SUMMARY

The present disclosure provides a dehydrogenation reaction apparatus and a system including the same that may stably maintain the temperature of a dehydrogenation reactor of a liquid organic hydrogen carrier while allowing rapid increase of the temperature of the dehydrogenation reactor when necessary.

A dehydrogenation reaction apparatus according to an embodiment of the present disclosure includes: a main housing; and a dehydrogenation reactor provided inside the main housing. In particular, the dehydrogenation reactor has a catalyst provided inside thereof and generates hydrogen from a liquid organic hydrogen carrier (LOHC). The dehydrogenation reaction apparatus further includes: a heating device provided inside the main housing and applying heat to the dehydrogenation reactor through a phase change material, wherein a phase change material is provided between the main housing, and the dehydrogenation reactor and the heating device.

In some embodiments, the liquid organic hydrogen carrier may include: decalin (decahydronaphthalene), decahydronaphthalene, tetralin (1,2,3,4-tetrahydronaphthalene), cyclohexane, dicyclohexyl, methylcyclohexane (MCH), N-ethylcarbazole (NEC), perhydro-N-ethylcarbazole, dibenzyltoluene (DBT), a mixture (BPDM) of biphenyl and diphenyl methane, a mixture (e.g., 35 wt %:65 wt %) of bicyclohexyl and dicyclohexylmethane, perhydro-monobenzyltoluene, perhydro-dibenzyltoluene, perhydro-N-methylindole, methylpiperidine, dimethylpiperidine, methylquinoline, bipiperidine, phenylpyridine, or combinations thereof.

The catalyst may include $Pt/Al_2O_3$, $Pt/C$, $Pd/Al_2O_3$, $Pd/C$, $Pt-Sn/Al_2O_3$, $Pt-Pd/Al_2O_3$, $Pt-Rh/Al_2O_3$, $Pt-Ru/Al_2O_3$, $Pt-Ir/Al_2O_3$, or combinations thereof. In certain examples, the catalyst may include a metal oxide including at least any one metal among platinum (Pt), palladium (Pd), ruthenium (Ru), nickel (Ni), Tin (Sn), Potassium (K), Cerium (Ce), Praseodymium (Pr), Magnesium (Mg), Zirconium (Zr), Yttrium (Y), Sulfur (S), and at least any one among $Al_2O_3$, $SiO_2$, and carbon as a supporting member.

The phase change material may include diphenylmethane, monobenzyltoluene, or dibenzyltoluene.

The heating device may be an electric heater.

The heating device may be a gas combustion apparatus.

In the dehydrogenation reactor, an inlet may be formed through which the liquid organic hydrogen carrier inflows, and an outlet where the liquid organic hydrogen carrier dehydrogenated in the dehydrogenation reactor is exhausted may be formed.

The dehydrogenation reactor and the heating device may be disposed in series.

The heating device and the dehydrogenation reactor may be disposed in parallel in the vertical direction.

The dehydrogenation reactor may be formed in a U-shape, an inlet through which the liquid organic hydrogen carrier inflows may be formed on one side of the U-shaped dehydrogenation reactor, and an outlet where dehydrogenated liquid organic hydrogen carriers are exhausted may be formed on the other side of the U-shaped dehydrogenation reactor.

The heating device may be formed of a shape corresponding to the dehydrogenation reactor.

The heating device may be disposed in the center of the main housing, the dehydrogenation reactor may be disposed to surround the heating device with a central housing interposed therebetween, a catalyst may be provided between the main housing and the central housing, and a phase change material may be provided between the heating device and the central housing.

An inlet through which the liquid organic hydrogen carrier inflows may be formed on one side of the main housing, and an outlet where the liquid organic hydrogen carrier dehydrogenated in the dehydrogenation reactor is exhausted may be formed on the other side of the main housing.

The dehydrogenation reactor may include a first dehydrogenation reactor and a second dehydrogenation reactor, the heating device and the first dehydrogenation reactor having a catalyst inside may be disposed in series, the second dehydrogenation reactor may be disposed to surround the heating device and the first dehydrogenation reactor with the central housing interposed therebetween, a catalyst may be provided between the main housing and the central housing, and the phase change material may be provided between the central housing and the heating device, and the first dehydrogenation reactor.

A first inlet through which the liquid organic hydrogen carrier inflows may be formed on one side of the main housing, a first outlet where the liquid organic hydrogen carrier dehydrogenated in the second dehydrogenation reactor is exhausted may be formed on the other side of the main housing, a second inlet through which the liquid organic hydrogen carrier inflows may be formed in the first dehydrogenation reactor, and a second outlet where the liquid organic hydrogen carrier dehydrogenated in the first dehydrogenation reactor is exhausted may be formed.

A dehydrogenation reaction system according to another embodiment of the present disclosure may include: the dehydrogenation reaction apparatus described above; a preheater for preheating the liquid organic hydrogen carrier supplied to the dehydrogenation reaction apparatus; and a gas-liquid separator that separates the hydrogen produced in the dehydrogenation reaction apparatus and the dehydrogenated liquid organic hydrogen carrier.

The gas-liquid separator may include: a chiller for cooling the dehydrogenated liquid organic hydrogen carrier; and a liquid tank for storing the liquid organic hydrogen carrier cooled by the chiller.

The dehydrogenation reaction system according to another embodiment of the present disclosure may further include a buffer tank installed downstream of the gas-liquid separator and storing hydrogen gas separated by the gas-liquid separator.

According to the dehydrogenation reaction apparatus and the system including the same according to an embodiment of the present disclosure as described above, by transferring the heat generated from the heating device to the dehydrogenation reactor through the phase change material, it is possible to reduce the temperature deviation for each position of the dehydrogenation reactor and prevent the hot zone from being generated in the dehydrogenation reactor.

BRIEF DESCRIPTION OF THE DRAWINGS

These drawings are for the purpose of describing embodiments of the present disclosure, and therefore the technical spirit of the present disclosure should not be construed as being limited to the accompanying drawings.

DETAILED DESCRIPTION OF THE EMBODIMENTS

Figure 1:
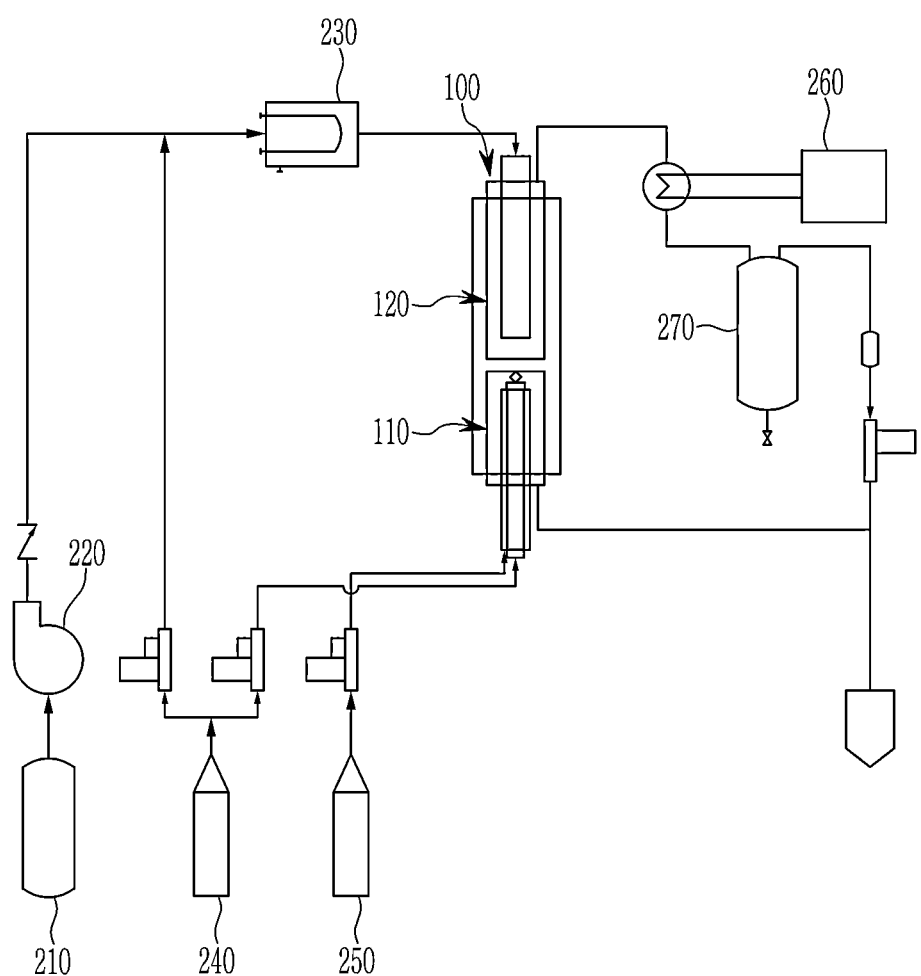
FIG. 1 is a schematic view showing a configuration of a dehydrogenation reaction system according to an embodiment of the present disclosure.

The present disclosure is described more fully hereinafter with reference to the accompanying drawings, in which embodiments of the present disclosure are shown. As those having ordinary skill in the art would realize, the described embodiments may be modified in various different ways, all without departing from the spirit or scope of the present disclosure.

In order to clarify the present disclosure, parts that are not connected with the description have been omitted, and the same elements or equivalents are referred to by the same reference numerals throughout the present disclosure.

Further, since sizes and thicknesses of constituent members shown in the accompanying drawings are arbitrarily given for better understanding and ease of description, the present disclosure is not limited to the illustrated sizes and thicknesses.

When a component, device, element, or the like of the present disclosure is described as having a purpose or performing an operation, function, or the like, the component, device, or element should be considered herein as being "configured to" meet that purpose or to perform that operation or function.

Hereinafter, a dehydrogenation reaction apparatus according to an embodiment of the present disclosure and a system including the same are described in detail with reference to the accompanying drawings.

FIG. 1 is a schematic view showing a configuration of a dehydrogenation reaction system according to an embodiment of the present disclosure. Also, FIG. 2 is a view showing a configuration of a dehydrogenation reaction apparatus according to a first embodiment of the present disclosure.

Figure 2:
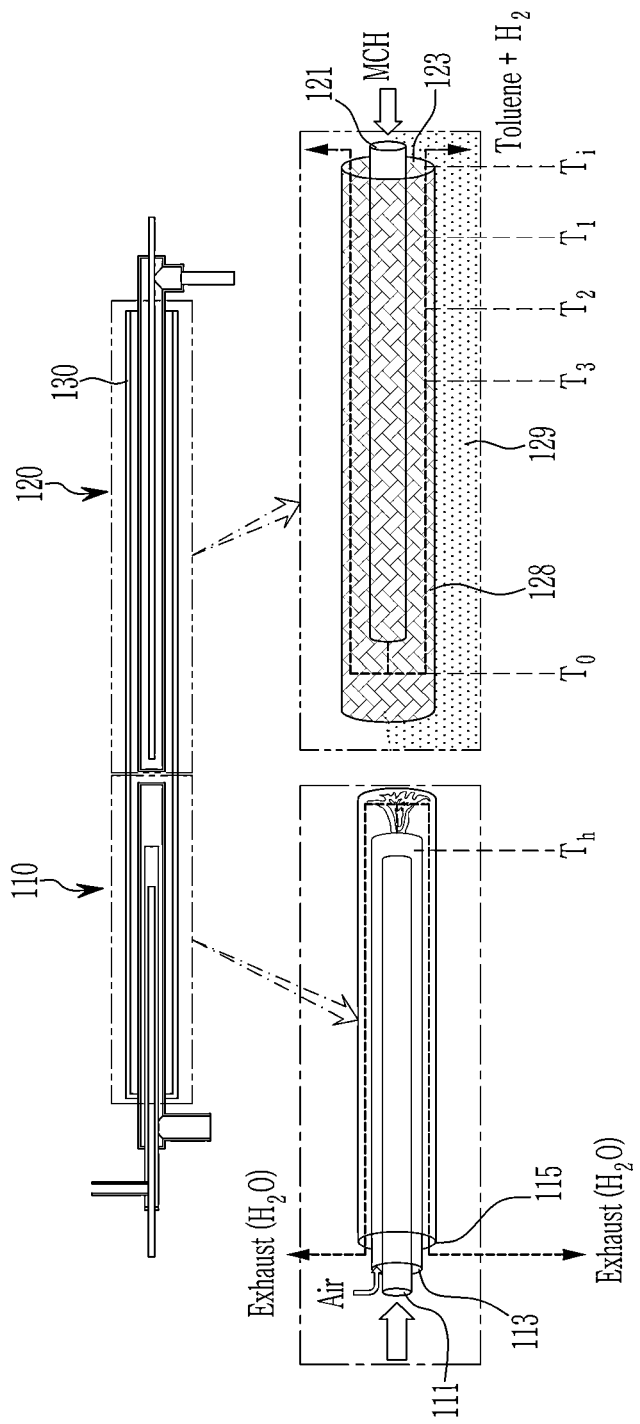
FIG. 2 is a view showing a configuration of a dehydrogenation reaction apparatus according to a first embodiment of the present disclosure.

As shown in FIG. 1 and FIG. 2, the dehydrogenation reaction system may include a LOHC tank 210, a dehydrogenation reaction apparatus 100 for generating hydrogen by an endothermic dehydrogenation reaction of the LOHC, and a gas-liquid separator 270 for separating hydrogen and the LOHC produced in the dehydrogenation reaction apparatus 100.

The LOHC tank 210 stores a liquid organic hydrogen carrier (LOHC) in a liquid state and supplies it to the dehydrogenation reaction apparatus 100.

The liquid organic hydrogen carrier may be a monocyclic hydrogenated aromatic compound, a bicyclic hydrogenated aromatic compound, or a tricyclic hydrogenated aromatic compound. The liquid organic hydrogen carrier may include, for example, decalin, decahydronaphthalene, tetralin, 1,2,3,4-tetrahydronaphthalene, cyclohexane, dicyclohexyl, methylcyclohexane (MCH), N-ethylcarbazole (NEC), perhydro-N-ethylcarbazole, dibenzyltoluene (DBT), a mixture (BPDM) of biphenyl and diphenyl methane, a mixture (e.g., 35 wt %:65 wt %) of bicyclohexyl and dicyclohexylmethane, perhydro-monobenzyltoluene, perhydro-dibenzyltoluene, perhydro-N-methylindole, methylpiperidine, dimethylpiperidine, methylquinoline, bipiperidine, phenylpyridine, or a combination thereof.

The LOHC tank 210 may supply the liquid organic hydrogen carrier to the dehydrogenation reaction apparatus 100. In one form, a pump 220 for pumping the liquid organic hydrogen carrier (LOHC) to the dehydrogenation reaction apparatus 100 may be installed between the LOHC tank 210 and the dehydrogenation reaction apparatus 100.

In addition, a preheater 230 for preheating the liquid organic hydrogen carrier supplied from the LOHC tank 210 may be installed upstream of the dehydrogenation reaction apparatus 100.

The dehydrogenation reaction apparatus 100 generates hydrogen by an endothermic dehydrogenation reaction of the liquid organic hydrogen carrier supplied from the LOHC tank 210.

To this end, the dehydrogenation reaction apparatus 100 may include a dehydrogenation reactor 120 provided inside the main housing 130 and a heating device 110 for supplying heat to the dehydrogenation reactor 120.

According to the first embodiment of the present disclosure, the dehydrogenation reactor 120 and the heating device 110 may be disposed adjacent to the same axis. Accordingly, the heat generated by the heating device 110 may be transferred to the side surface and the exterior circumference of the dehydrogenation reactor 120 through the phase change material 129. In other words, in the dehydrogenation reaction apparatus 100 according to the first embodiment of the present disclosure, the heating device 110 and the dehydrogenation reactor 120 are disposed in series. In one form, the main housing 130 of the dehydrogenation reaction apparatus is formed in a substantially cylindrical shape, and the cylinder-shaped heating device 110 and the cylindrical dehydrogenation reactor 120 are disposed in series.

For example, in the endothermic dehydrogenation reaction, the double bond of the benzene ring of the liquid organic hydrogen carrier is broken and six hydrogen atoms may be stored. The reaction to break the double bond of the benzene ring included in the liquid organic hydrogen carrier is an endothermic reaction that takes place at a reaction temperature in a range of 150 to 350° C.

In the dehydrogenation reactor 120, an inlet 121 through which the liquid organic hydrogen carriers supplied from the LOHC tank 210 are inflowed, and an outlet 123 through which the dehydrogenated liquid organic hydrogen carriers and hydrogen are exhausted from the dehydrogenation reactor 120 are formed.

The endothermic dehydrogenation reaction may be carried out under the presence of the catalyst 128, and the dehydrogenation reactor 120 may be equipped with a solid catalyst 128 therein. As an example, the catalyst 128 of the endothermic dehydrogenation reaction may include Pt/Al$_2$O$_3$, Pt/C, Pd/Al$_2$O$_3$, Pd/C, Pt—Sn/Al$_2$O$_3$, Pt—Pd/Al$_2$O$_3$, Pt—Rh/Al$_2$O$_3$, Pt—Ru/Al$_2$O$_3$, Pt—Ir/Al$_2$O$_3$, or combinations thereof. In another example, the catalyst 128 may include a metal oxide for supporting at least any one metal of Pt, Pd, Ru, Ni, Sn, K, Ce, Pr, Mg, Zr, Y, or S, and at least any one of Al$_2$O$_3$, SiO$_2$, or carbon as a support member.

The heating device 110 supplies heat to the dehydrogenation reactor 120 where the endothermic dehydrogenation reaction takes place, and for this, the heating device 110 may be a gas combustion apparatus (e.g., a gas burner) that generates heat by using hydrogen, methane, or liquefied natural gas, or an electric heater that generates heat by using electrical energy.

When the heating device 110 is the combustion apparatus, in the heating device 110, a gas inlet 111 through which the combustion gas supplied from the gas tank storing the combustion gas (e.g., hydrogen, methane, liquefied natural gas, or LOHC) is inflowed, an air inlet 113 through which air supplied from the air tank 250 is inflowed, and an outlet 115 through which the exhaust gas and water generated from the heating device 110 are exhausted may be formed.

In one embodiment, the heating device 110 may be used in combination with a combustion apparatus and an electric heater.

A phase change material 129 may be provided inside the main housing 130. More specifically, the phase change material 129 may fill a part or all between the main housing 130, and the dehydrogenation reactor 120 and the heating device 110.

The phase change material (PCM) 129 may be a hydrocarbon-based organic material with a boiling point in a range of 150-400° C., such as diphenylmethane, monobenzyltoluene, or dibenzyltoluene.

When the heating device 110 is not in operation, the phase change material 129 may exist as a liquid. When the heating device 110 operates to generate high temperature heat, the heat is transferred to the dehydrogenation reactor 120 by using latent heat generated by vaporizing the phase change material 129.

Meanwhile, the material of the main housing 130, the housing of the heating device 110, and/or the housing of the dehydrogenation reactor 120 may be made of stainless steel or copper (Cu). In one embodiment, if each housing is made of copper, it may be coated with boron nitride to improve the oxidation resistance of copper.

On the other hand, when the endothermic dehydrogenation reaction in the dehydrogenation reactor 120 is a gas phase reaction, a gas-liquid separator 270 for separating hydrogen and dehydrogenated LOHC from the reaction product generated in the dehydrogenation reactor 120 of the dehydrogenation apparatus may be installed. In this case, the gas-liquid separator may include a chiller 271 that separates hydrogen gas by cooling the dehydrogenated LOHC in the gas phase, and a liquid tank 273 that stores the liquefied LOHC.

At the downstream of the gas-liquid separator 270, a buffer tank 280 that stores hydrogen generated in the dehydrogenation reaction apparatus may be installed. Hydrogen (i.e., hydrogen gas) may be stored in the buffer tank 280 by compressing the hydrogen to a pressure in a range of 1 bar to 200 bar through a pressure regulator (not shown).

According to the first embodiment of the present disclosure as described above, the heat generated by the heating device 110 heats the dehydrogenation reactor 120 through the phase change material 129 filled in the interior of the main housing 130. According to an embodiment of the present disclosure, the heat generated by the heating device 110 is not directly supplied to the dehydrogenation reactor 120, but is supplied to the dehydrogenation reactor 120 through the phase change material 129.

As described above, since heat is supplied from the heating device 110 to the dehydrogenation reactor 120 through the phase change material 129 in a latent heat manner, the entire area of the dehydrogenation reactor 120 may be uniformly supplied with heat.

Figure 3:
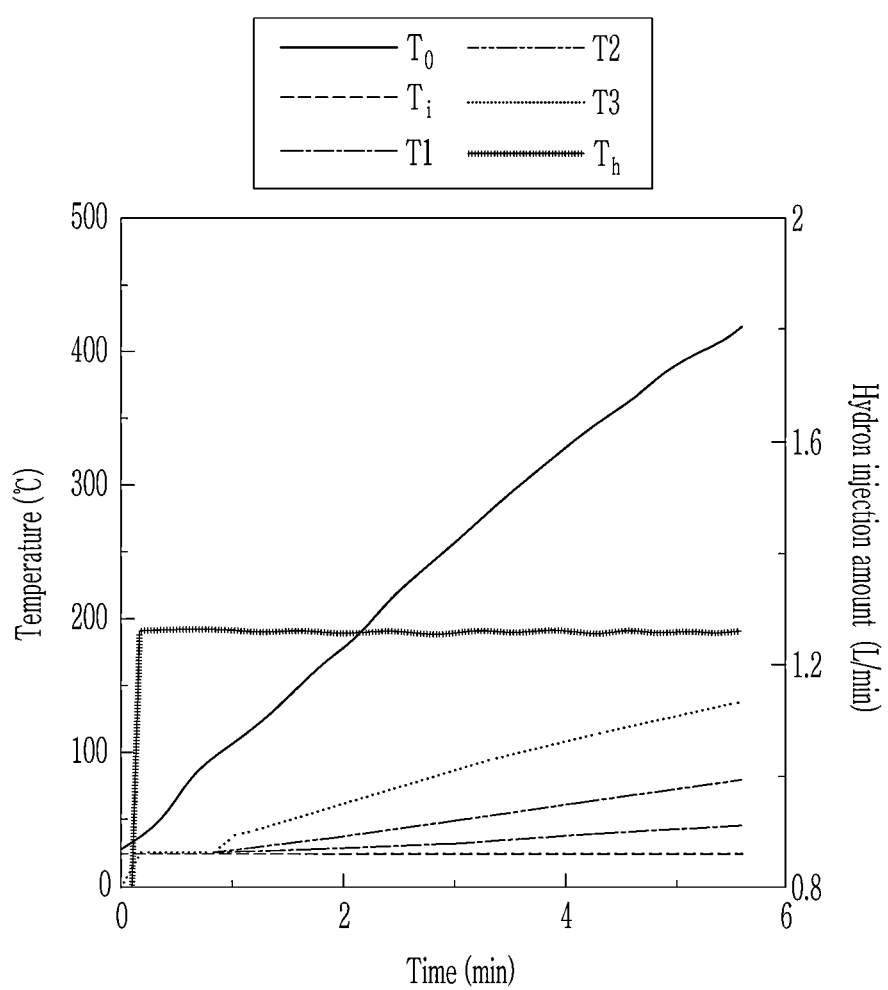
FIG. 3 and FIG. 4 are graphs measuring a temperature change of a dehydrogenation reactor.
Figure 4:
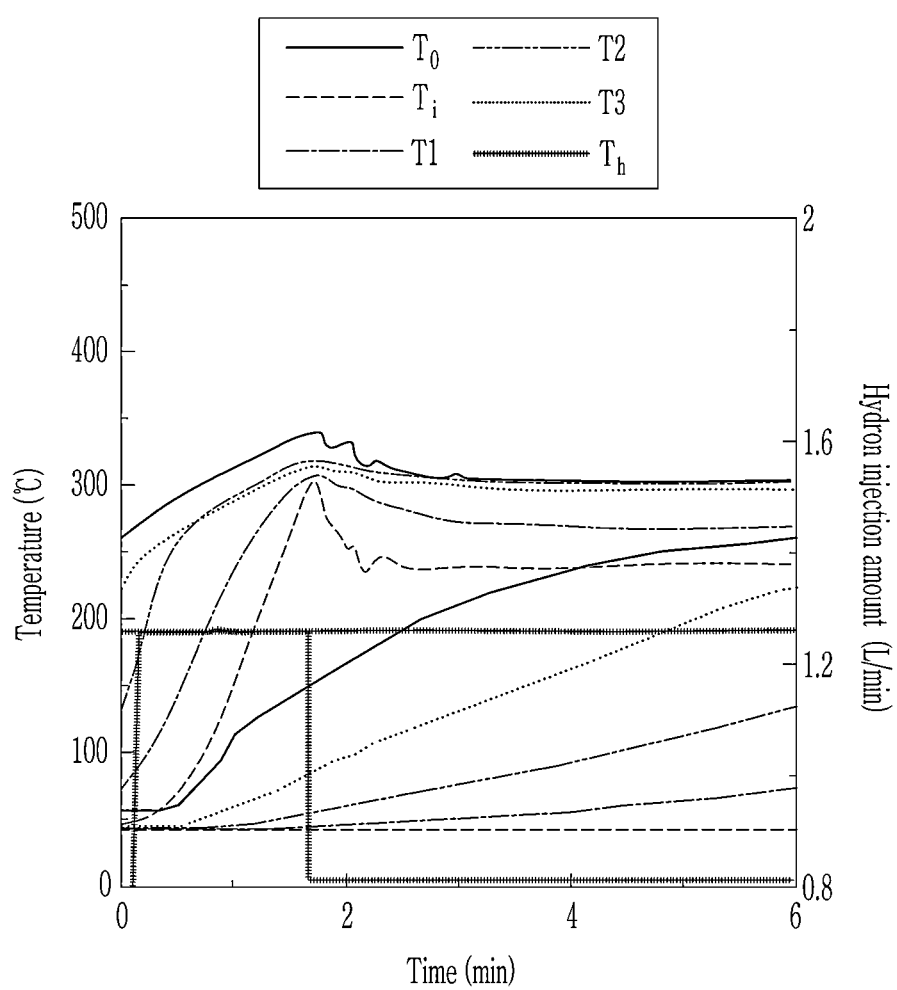
Figure 5:
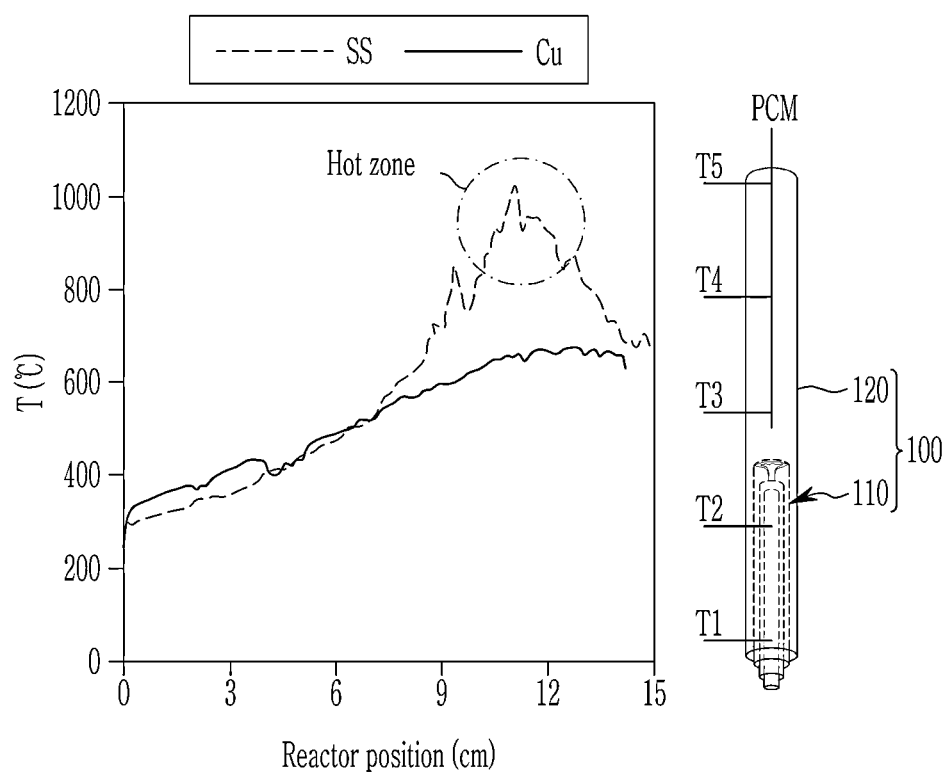
FIG. 5 is a graph showing a temperature change of a dehydrogenation reaction apparatus according to an embodiment of the present disclosure.

FIG. 3 to FIG. 5 are graphs of measurement of a temperature change of the dehydrogenation reactor 120.

FIG. 3 is a graph showing the temperature change for each position of the dehydrogenation reactor 120 when heat is directly supplied to the dehydrogenation reactor 120 from the heating device 110 without going through the phase change material 129, and FIG. 4 is a graph showing the temperature change for each position of the dehydrogenation reactor 120 when heat is supplied from the heating device 110 to the dehydrogenation reactor 120 through the phase change material 129.

FIG. 3 and FIG. 4 are graphs showing the temperature change of the dehydrogenation reactor 120 when the same amount is supplied to the heating device 110 by using hydrogen as a heat source.

Referring to FIG. 3, If heat is directly supplied from the heating device 110 to the dehydrogenation reactor 120 without going through the phase change material 129, it may be seen that the temperature of the dehydrogenation reactor 120 adjacent to the heating device 110 rises rapidly, but the temperature of the dehydrogenation reactor 120 located relatively far from the heating device 110 increase slowly.

When the heat is supplied directly from the heating device 110 to the dehydrogenation reactor 120, since the temperature (e.g., over 400 degrees Celsius) of the dehydrogenation reactor 120 adjacent to the heating device 110 is too much higher than the activation temperature (e.g., about 300 degrees Celsius) of the catalyst 128, there is a degradation problem of the catalyst 128.

Referring to FIG. 4, if heat is supplied from the heating device 110 to the dehydrogenation reactor 120 through the phase change material 129, it may be seen that the temperature increase in the dehydrogenation reactor 120 at the portion adjacent to the heating device 110 is relatively slow, but the temperature increase in the dehydrogenation reactor 120 at the portion relatively far from the heating device 110 is relatively fast.

In addition, even after a predetermined time (e.g., 6 minutes) has elapsed from the initial heating, it may be seen that the entire area of the dehydrogenation reactor 120 is evenly maintained at a temperature close to the activation temperature of the catalyst 128 (e.g., 300 degrees Celsius).

FIG. 5 is a graph showing a temperature change of a dehydrogenation reaction apparatus according to an embodiment of the present disclosure.

In FIG. 5, a solid line is a curve showing the temperature change when the material of the housings (e.g., the main housing 130, the housing of the dehydrogenation reactor 120, and the housing of the heating device 110) of the dehydrogenation reaction apparatus 100 is copper (Cu), and a dotted line is a curve showing the temperature change when the material of the housings (e.g., the main housing 130, the housing of the dehydrogenation reactor 120, and the housing of the heating device 110) of the dehydrogenation reaction apparatus 100 is stainless steel (SS:).

As shown in FIG. 5, when the material of the dehydrogenation reaction apparatus 100 is stainless steel, it may be seen that the temperature change (or a temperature gradient) of the dehydrogenation reactor 120 of the dehydrogenation reaction apparatus 100 is relatively large and a hot zone occurs.

On the other hand, when the material of the dehydrogenation reaction apparatus 100 is copper, it may be seen that the hot zone does not occur and the temperature change of the dehydrogenation reactor 120 is relatively reduced.

In the endothermic dehydrogenation reaction, the difference in a hydrogen conversion rate is very large depending on the temperature of the catalyst 128. That is, a high hydrogen conversion rate may be expected when the temperature deviation inside the dehydrogenation reactor 120 is small.

Therefore, when the material of the dehydrogenation reaction apparatus 100 is copper, since the temperature change of the dehydrogenation reactor 120 is relatively small, the high hydrogen conversion rate may be realized.

FIG. 6 is another graph showing a temperature change of a dehydrogenation reaction apparatus according to an embodiment of the present disclosure.

Figure 6A:
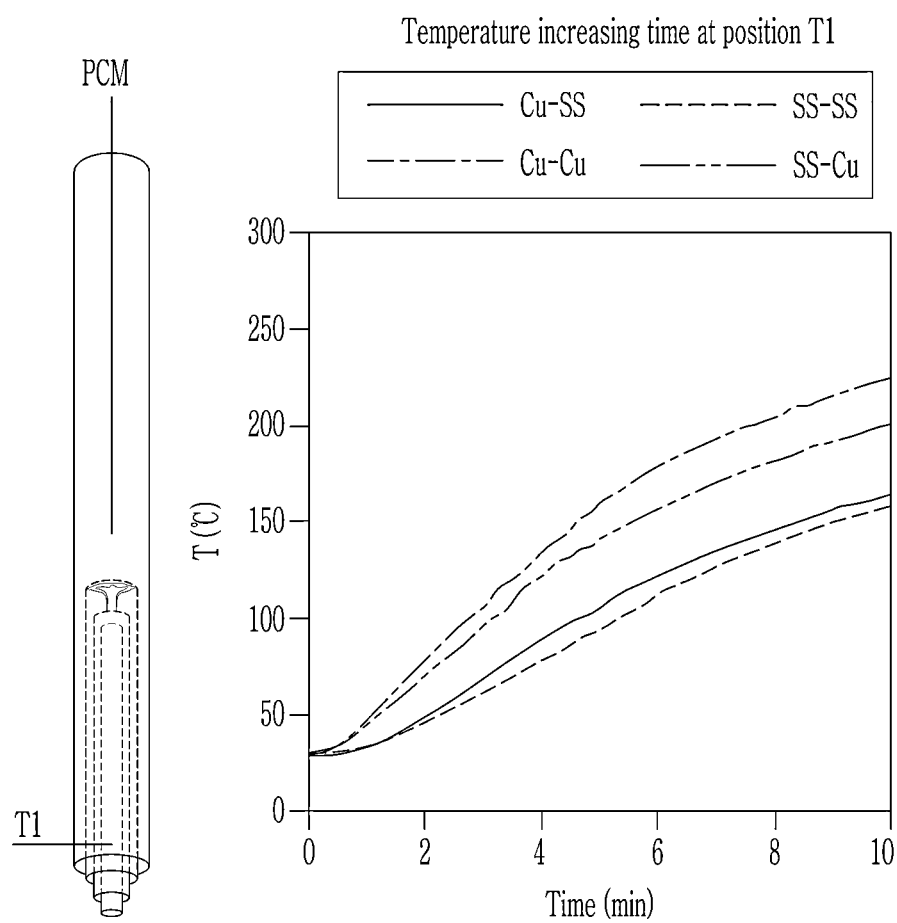
FIG. 6 is another graph showing a temperature change of a dehydrogenation reaction apparatus according to an embodiment of the present disclosure.

FIG. 6A shows the temperature change of the position T1 of the dehydrogenation reaction apparatus 100, a solid line shows the temperature change when the material of the heating device 110 is copper and the material of the main housing 130 is stainless steel, a dotted line shows the temperature change when the material of the heating device 110 and the main housing 130 is stainless steel, a single-dot chain line shows the temperature change when the material of the heating device 110 and the main housing 130 is copper, and a double-dot chain line shows the temperature change when the material of the heating device 110 is stainless steel and the material of the main housing 130 is copper.

Figure 6B:
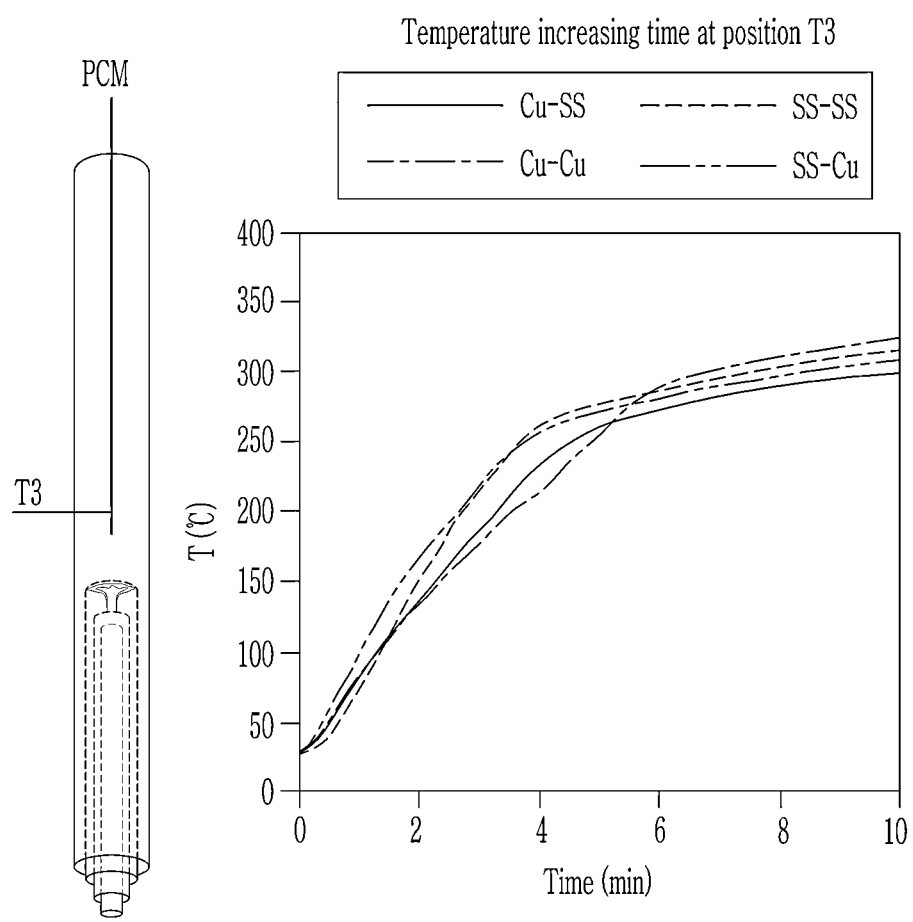

FIG. 6B shows the temperature change of the position T2 of the dehydrogenation reaction apparatus 100, a solid line shows the temperature change when the material of the heating device 110 is copper and the material of the main housing 130 is stainless steel, a dotted line shows the temperature change when the material of the heating device 110 and the main housing 130 is stainless steel, a single-dot chain line shows the temperature change when the material of the heating device 110 and the main housing 130 is copper, and a double-dot chain line shows the temperature change when the material of the heating device 110 is stainless steel and the material of the main housing 130 is copper.

Figure 6C:
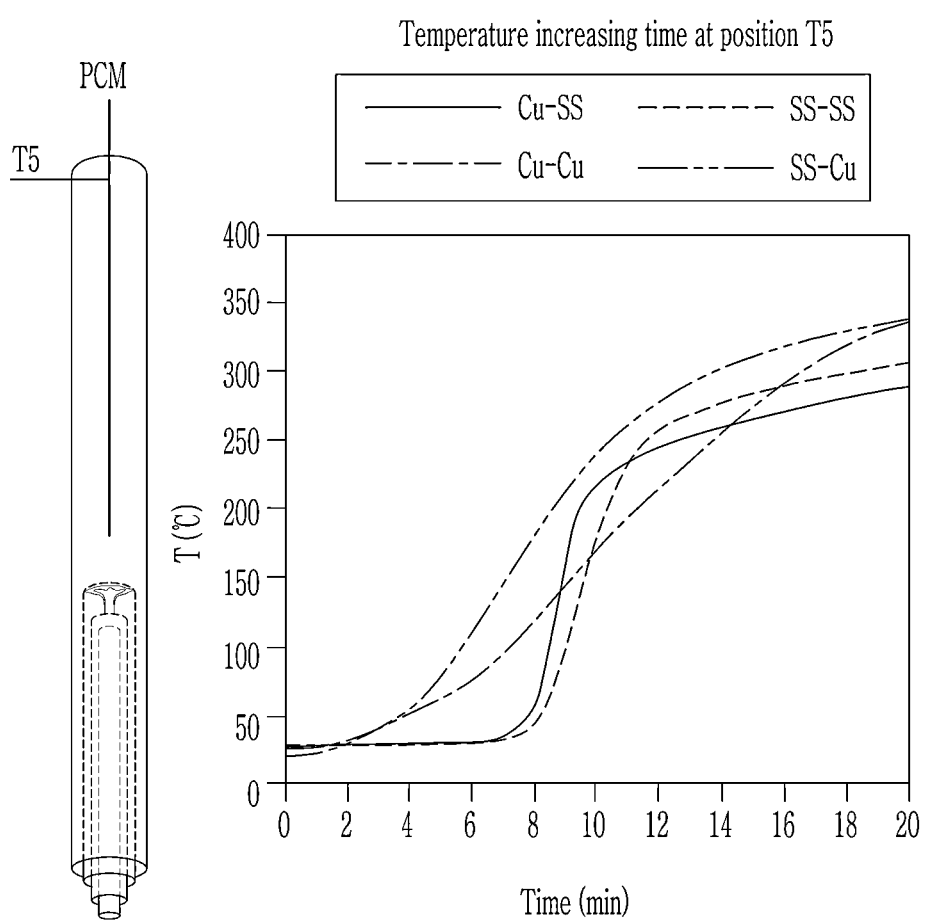

FIG. 6C shows the temperature change of the position T3 of the dehydrogenation reaction apparatus 100, a solid line shows the temperature change when the material of the heating device 110 is copper and the material of the main housing 130 is stainless steel, a dotted line shows the temperature change when the material of the heating device 110 and the main housing 130 is stainless steel, a single-dot chain line shows the temperature change when the material of the heating device 110 and the main housing 130 is copper, and a double-dot chain line shows the temperature change when the material of the heating device 110 is stainless steel and the material of the main housing 130 is copper.

As shown in FIG. 6, In the dehydrogenation reaction apparatus 100, the catalyst 128 is present in the position T2 and the position T3. When considering the position of the catalyst 128, in order to rapidly increase the temperature of the dehydrogenation reactor 120, it is desired that the material of the heating device 110 and the main housing 130 is copper, or that the material of the heating device 110 is stainless steel and the material of the main housing 130 is copper.

As described above, fabricating the material of the dehydrogenation reaction apparatus 100 with copper is advantageous for the temperature increasing and the temperature gradient of the dehydrogenation reactor 120. However, if the material of the dehydrogenation reaction apparatus 100 is made of copper, there is a possibility that thermochemical corrosion may occur. Therefore, in order to prevent this problem, the oxidation resistance of the dehydrogenation reaction apparatus 100 may be improved by coating copper with boron nitride.

The configuration of the dehydrogenation reaction apparatus 100 according to the second embodiment of the present disclosure is described in detail with reference to the accompanying drawings.

The dehydrogenation reaction system to which the dehydrogenation reaction apparatus 100 according to the second embodiment of the present disclosure is applied is almost the same as the dehydrogenation reaction system described in the first embodiment of the present disclosure described above. However, only the composition of the dehydrogenation reaction apparatus 100 is different. Hereinafter, only the parts that are different from the first embodiment of the present disclosure are described in detail.

Figure 7:
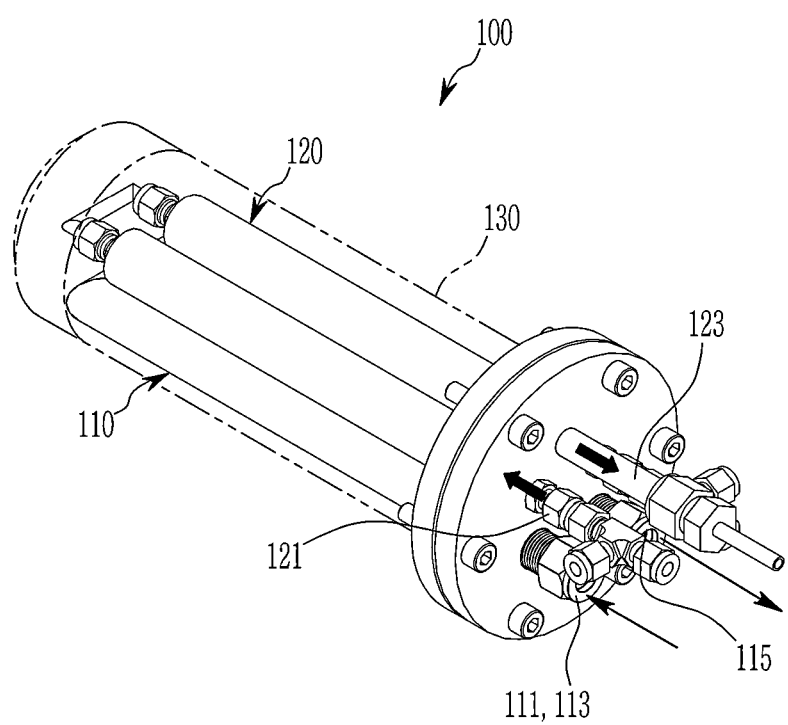
FIG. 7 is a perspective view showing a configuration of a dehydrogenation reaction apparatus according to the second embodiment of the present disclosure.
Figure 8:
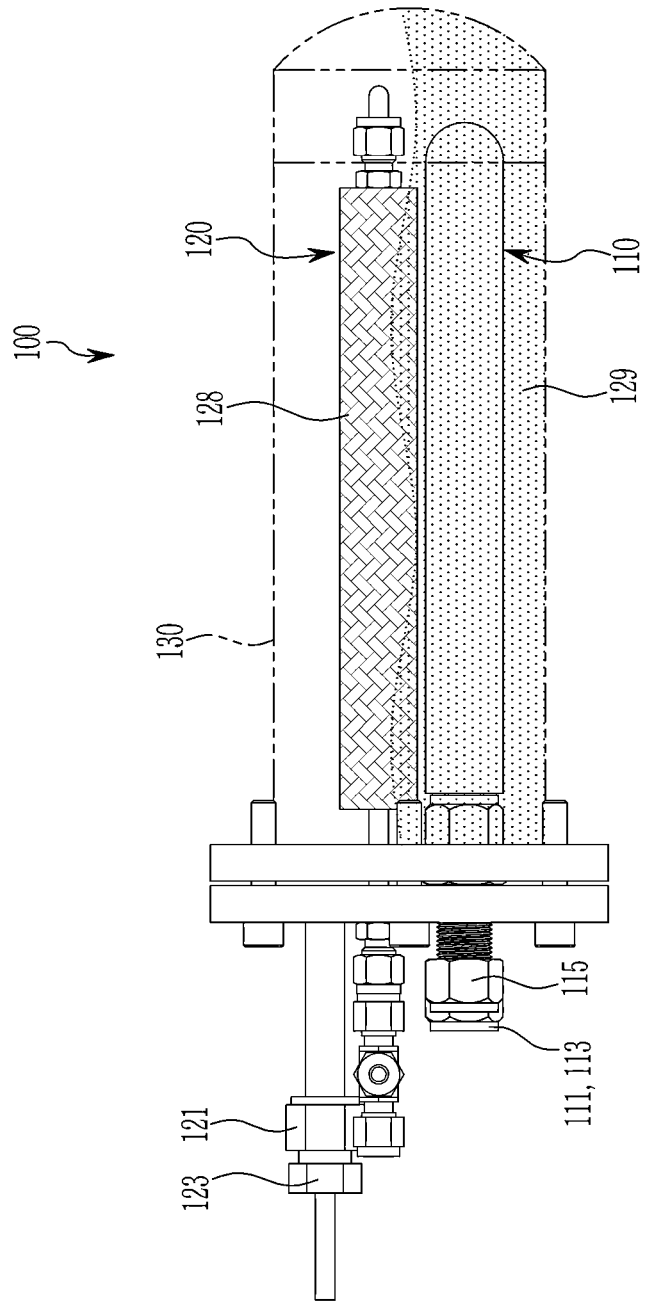
FIG. 8 is a cross-sectional view showing a configuration of a dehydrogenation reaction apparatus according to a second embodiment of the present disclosure.

FIG. 7 is a perspective view showing a configuration of a dehydrogenation reaction apparatus according to the second embodiment of the present disclosure. FIG. 8 is a cross-sectional view showing a configuration of a dehydrogenation reaction apparatus according to a second embodiment of the present disclosure.

As shown in FIG. 7 and FIG. 8, the dehydrogenation reaction apparatus 100 may include a dehydrogenation reactor 120 disposed on an upper side of the main housing 130 and a heating device 110 disposed on a lower side of the dehydrogenation reactor 120. That is, in the second embodiment of the present disclosure, the dehydrogenation reactor 120 and the heating device 110 are disposed in parallel. In other words, the main housing 130 of the dehydrogenation reaction apparatus is formed in a substantially cylindrical shape, and the heating device 110 and the dehydrogenation reactor 120 are disposed in parallel in a vertical direction inside the cylindrical main housing 130.

The dehydrogenation reactor 120 is approximately U-shaped, and an inlet 121 through which the liquid organic hydrogen carrier inflows is formed on one side of the U-shaped dehydrogenation reactor 120, while an outlet 123 is formed through which the dehydrogenated liquid organic hydrogen carrier is exhausted is formed on the other side of the U-shaped dehydrogenation reactor 120. A solid catalyst 128 may be provided inside the dehydrogenation reactor 120.

The heating device 110 may be formed in an approximately U shape corresponding to the dehydrogenation reactor 120. As in the first embodiment of the present disclosure described above, the heating device 110 may be a gas combustion apparatus (a gas burner) that generates heat by using hydrogen, methane, or liquefied natural gas, or an electric heater that generates heat by using electrical energy.

When the heating device 110 is the gas combustion apparatus, on one side of the U-shaped heating device 110, a gas inlet 111 through which the combustion gas supplied from the gas tank storing the combustion gas (e.g., hydrogen, methane, the liquefied natural gas, or the LOHC) and air is inflowed may be formed, an air inlet 113 through which air supplied from the air tank 250 is inflowed may be formed, and an outlet 115 through which the exhaust gas and water generated from the heating device 110 are exhausted may be formed.

A phase change material 129 is provided inside the main housing 130. More specifically, the phase change material 129 may fill the main housing 130, and a part or all between the dehydrogenation reactor 120 and the heating device 110.

When the heating device 110 is not in operation, the phase change material 129 may exist as a liquid. When the heating device 110 operates to generate high temperature heat, the heat is transferred to the dehydrogenation reactor 120 by using the latent heat generated by vaporizing the phase change material 129.

According to the second embodiment of the present disclosure, it is possible to maximize the size of the dehydrogenation reactor 120 in the same state as the entire size of the dehydrogenation reaction apparatus 100, thereby greatly increasing the amount of the catalyst 128 accommodated in the dehydrogenation reactor 120. According to the experiment, compared with the first embodiment of the present disclosure described above, it is possible to increase the amount of catalyst 128 by about 10 times.

In addition, since the dehydrogenation reactor 120 and the heating device 110 are disposed in parallel in the vertical direction, the heat transferring distance between the heating device 110 and the dehydrogenation reactor 120 is reduced. Accordingly, the time required for the dehydrogenation reactor 120 to reach the activation temperature of the catalyst 128 may be relatively reduced.

The configuration of the dehydrogenation reaction apparatus 100 according to the third embodiment of the present disclosure is described in detail with reference to the accompanying drawings.

The dehydrogenation reaction system to which the dehydrogenation reaction apparatus 100 according to the third embodiment of the present disclosure is applied is substantially the same as the dehydrogenation reaction system described in the first and second embodiments of the present disclosure described above. However, only the composition of the dehydrogenation reaction apparatus 100 is different. Hereinafter, only the parts that are different from the first and second embodiments of the present disclosure are described in detail.

Figure 9:
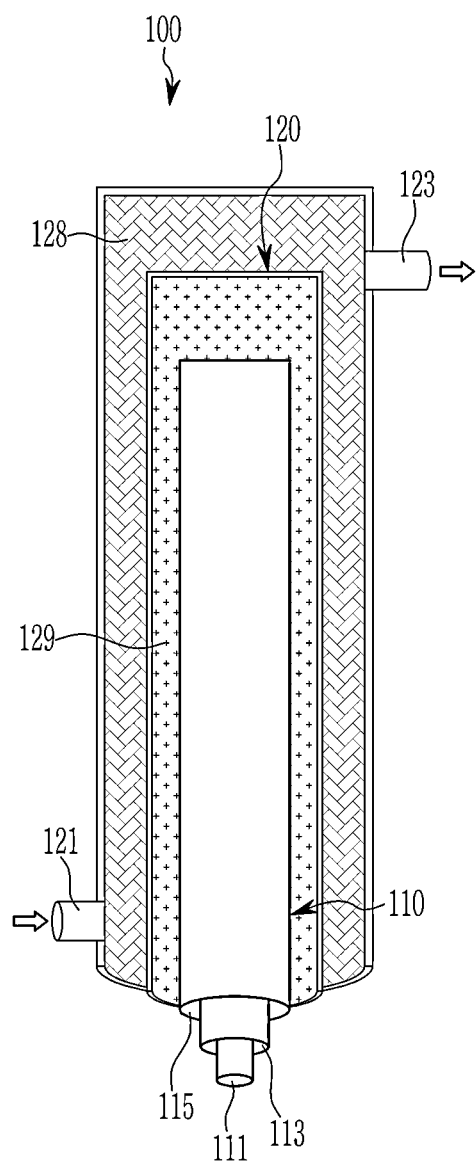
FIG. 9 is a schematic view showing a configuration of a dehydrogenation reaction apparatus according to a third embodiment of the present disclosure.

FIG. 9 is a schematic view showing a configuration of a dehydrogenation reaction apparatus according to a third embodiment of the present disclosure.

As shown in FIG. 9, the dehydrogenation reaction apparatus 100 according to the third embodiment of the present disclosure may include a heating device 110 provided in the interior of the main housing 130, and a dehydrogenation reactor 120 disposed to surround the periphery of the heating device 110.

According to a third embodiment of the present disclosure, the main housing 130 is formed in a substantially cylindrical shape, and the cylindrical heating device 110 is disposed in the center of the main housing 130.

As described above in the previous embodiment of the present disclosure, the heating device 110 may be a gas combustion apparatus (a gas burner) that generates heat by using hydrogen, methane, or liquefied natural gas, or an electric heater that generates heat by using electrical energy.

When the heating device 110 is the gas combustion apparatus, on one side of the heating device 110, a gas inlet 111 through which the combustion gas supplied from the gas tank storing the combustion gas (e.g., hydrogen, methane, the liquefied natural gas, or the LOHC) and air is inflowed may be formed, an air inlet 113 through which air supplied from the air tank 250 is inflowed may be formed, and an outlet 115 through which the exhaust gas and water generated from the heating device 110 are exhausted may be formed.

The dehydrogenation reactor 120 may include a central housing 140 disposed to surround the heating device 110 except for a portion where the gas inlet 111 and the outlet 115 of the heating device 110 are formed, and a phase change material 129 provided between the central housing 140 and the main housing 130. That is, the dehydrogenation reactor 120 may be disposed to surround the heating device 110 via the central housing 140 interposed therebetween. The central housing 140 may be formed in a cylindrical shape to surround the central housing 140 of the outer side in the radial direction of the heating device 110 and the opposite side where the gas inlet 111 and the outlet 115 are formed.

In addition, an inlet 121 through which the liquid organic hydrogen carrier inflows is formed on one side of the main housing 130, and an outlet 123 through which the dehydrogenated liquid organic hydrogen carrier is exhausted is formed on the other side of the main housing 130.

A solid catalyst 128 may be provided between the main housing 130 and the central housing 140.

In addition, a phase change material 129 may be provided between the heating device 110 and the central housing 140. More specifically, the phase change material 129 may fill some or all of the space between the heating device 110 and the central housing 140.

When the heating device 110 is not in operation, the phase change material 129 may exist as a liquid. When the heating device 110 operates to generate high temperature heat, the heat is transferred to the dehydrogenation reactor 120 by using the latent heat generated by vaporizing the phase change material 129.

According to the third embodiment of the present disclosure, since the dehydrogenation reactor 120 is disposed to surround the outside of the heating device 110, the heat transferring efficiency and the entirety system efficiency from the heating device 110 to the dehydrogenation reactor 120 may be increased compared to the first and second embodiments of the present disclosure.

Finally, the configuration of the dehydrogenation reaction apparatus 100 according to the fourth embodiment of the present disclosure is described in detail with reference to the accompanying drawings.

The dehydrogenation reaction system to which the dehydrogenation reaction apparatus 100 according to the fourth embodiment of the present disclosure is applied is substantially the same as the dehydrogenation reaction system described in the first to third embodiments of the present disclosure described above. However, only the composition of the dehydrogenation reaction apparatus 100 is different. Hereinafter, only the parts that are different from the first to third embodiments of the present disclosure are described in detail.

Figure 10:
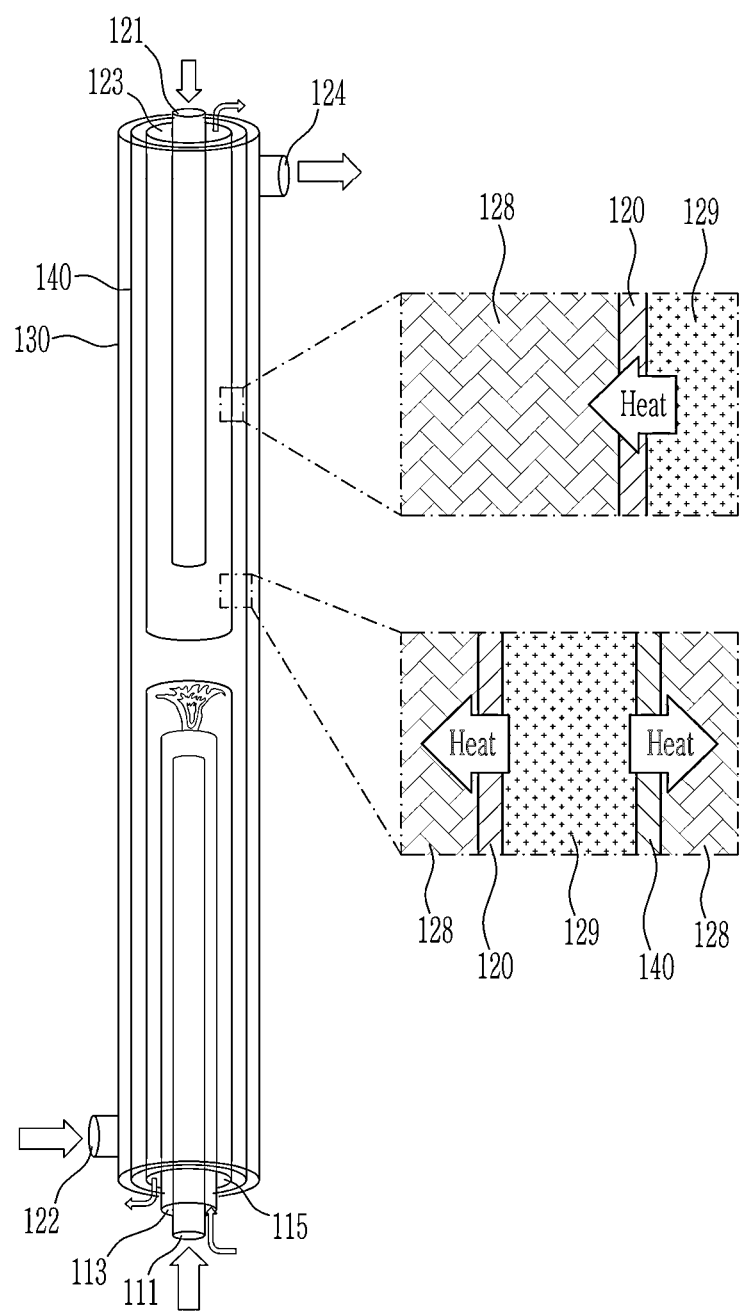
FIG. 10 is a schematic view showing a configuration of a dehydrogenation reaction apparatus according to a fourth embodiment of the present disclosure.

FIG. 10 is a schematic view showing a configuration of a dehydrogenation reaction apparatus according to a fourth embodiment of the present disclosure.

As shown in FIG. 10, for the dehydrogenation reaction apparatus 100 according to an embodiment of the present disclosure, a heating device 110 and two dehydrogenation reactors 120 are disposed inside the main housing 130.

Specifically, the main housing 130 is formed in a substantially cylindrical shape, and the cylindrical heating device 110 is disposed in the center of the main housing 130.

As described above in the previous embodiment of the present disclosure, the heating device 110 may be a gas combustion apparatus (a gas burner) that generates heat by using hydrogen, methane, or liquefied natural gas, or an electric heater that generates heat by using electrical energy.

When the heating device 110 is the gas combustion apparatus, on one side of the heating device 110, a gas inlet 111 through which the combustion gas supplied from the gas tank storing the combustion gas (e.g., hydrogen, methane, the liquefied natural gas, or the LOHC) and air is inflowed may be formed, an air inlet 113 through which air supplied from the air tank 250 is inflowed may be formed, and an outlet 115 through which the exhaust gas and water generated from the heating device 110 are exhausted may be formed.

Two dehydrogenation reactors 120 may include a first dehydrogenation reactor 120 disposed in series with the heating device 110 and having a catalyst 128 therein, and a second dehydrogenation reactor 120 disposed to surround the heating device 110 and the first dehydrogenation reactor 120 with a central housing 140 interposed therebetween.

In other words, the first dehydrogenation reactor 120 and the heating device 110 are disposed adjacent to each other on the same axis, and the solid catalyst 128 may be provided inside the first dehydrogenation reactor 120. In the first dehydrogenation reactor 120 on the opposite side where the gas inlet 111 and outlet 115 of the heating device 110 are formed, a first inlet 121 through which the liquid organic hydrogen carrier inflows and a first outlet 123 through which the dehydrogenated liquid organic hydrogen carrier is exhausted are formed.

The second dehydrogenation reactor 120 may include a central housing 140 disposed to surround the radial direction outside of the heating device 110 and the first dehydrogenation reactor 120 disposed in series, a main housing 130 disposed to surround the radial direction outside of the central housing 140, and a catalyst 128 provided between the central housing 140 and the main housing 130.

The central housing 140 and the main housing 130 may be formed in a cylindrical shape.

In addition, a second inlet 122 through which the liquid organic hydrogen carrier inflows is formed on one side of the main housing 130, and a second outlet 124 through which the dehydrogenated liquid organic hydrogen carrier is exhausted is formed on the other side of the main housing 130.

At this time, a phase change material 129 is provided between the central housing 140, and the heating device 110 and the first dehydrogenation reactor 120 disposed in series. The phase change material 129 may fill the central housing 140, and some or all of between the heating device 110 and the first dehydrogenation reactor 120.

When the heating device 110 is not in operation, the phase change material 129 may exist as a liquid. When the heating device 110 operates to generate high temperature heat, the heat is transferred to the dehydrogenation reactor 120 by using the latent heat generated by vaporizing the phase change material 129.

That is, the heat generated by the heating device 110 may be transferred to the side and exterior circumference of the first dehydrogenation reactor 120 through the phase change material 129, and may be transferred to the exterior circumference of the second dehydrogenation reactor 120 through the phase change material 129.

According to the fourth embodiment of the present disclosure, the first dehydrogenation reactor 120 is disposed in series with the heating device 110, and the second dehydrogenation reactor 120 is disposed outside the heating device 110 and the first dehydrogenation reactor 120 in the radial direction, so that the space efficiency of the dehydrogenation reactor 120 may be maximized. In addition, the system efficiency may be increased because the heat loss to the outside may be utilized to the maximum for the catalyst reaction.

According to the dehydrogenation reaction apparatus and the system including the same according to an embodiment of the present disclosure as described above, by transferring the heat generated from the heating device to the dehydrogenation reactor through the phase change material, it is possible to reduce the temperature deviation for each position of the dehydrogenation reactor and prevent the hot zone from being generated in the dehydrogenation reactor. Through this, the hydrogen conversion rate of the dehydrogenation reactor may be increased while maximizing the utilization of the heat source.

While this present disclosure has been described in connection with what is presently considered to be practical embodiments, it should be understood that the present disclosure is not limited to the disclosed embodiments. On the contrary, it is intended to cover various modifications and equivalent arrangements included within the spirit and scope of the present disclosure.

DESCRIPTION OF SYMBOLS

100: dehydrogenation reaction apparatus
110: heating device
111: gas inlet
113: air inlet
115: outlet
120: dehydrogenation reactor
121: inlet
123: outlet
128: catalyst
129: phase change material
130: main housing
140: central housing
210: LOHC tank
220: pump
230: preheater
240: hydrogen tank
250: air tank
270: gas-liquid separator
280: buffer tank

What is claimed is:

1. A dehydrogenation reaction apparatus comprising:
a main housing;
a dehydrogenation reactor provided inside the main housing and including a catalyst, the dehydrogenation reactor configured to generate hydrogen from a liquid organic hydrogen carrier (LOHC); and
a heating device provided inside of the main housing and configured to apply heat to the dehydrogenation reactor through a phase change material,
wherein the phase change material is provided between the main housing, the dehydrogenation reactor and the heating device.

2. The dehydrogenation reaction apparatus of claim 1, wherein
the liquid organic hydrogen carrier comprises decalin, decahydronaphthalene, tetralin, 1,2,3,4-tetrahydronaphthalene, cyclohexane, dicyclohexyl, methylcyclohexane (MCH), N-ethylcarbazole (NEC), perhydro-N-ethylcarbazole, dibenzyltoluene (DBT), a mixture (BPDM) of biphenyl and diphenyl methane, a mixture of bicyclohexyl and dicyclohexylmethane, perhydro-monobenzyltoluene, perhydro-dibenzyltoluene, perhydro-N-methylindole, methylpiperidine, dimethylpiperidine, methylquinoline, bipiperidine, phenylpyridine, or combinations thereof.

3. The dehydrogenation reaction apparatus of claim 1, wherein
the catalyst comprises $Pt/Al_2O_3$, Pt/C, $Pd/Al_2O_3$, Pd/C, $Pt—Sn/Al_2O_3$, $Pt—Pd/Al_2O_3$, $Pt—Rh/Al_2O_3$, $Pt—Ru/Al_2O_3$, $Pt—Ir/Al_2O_3$, or combinations thereof, or
the catalyst comprises a metal oxide having at least any one metal among Pt, Pd, Ru, Ni, Sn, K, Ce, Pr, Mg, Zr, Y, or S, and a supporting member comprising $Al_2O_3$, $SiO_2$, or carbon.

4. The dehydrogenation reaction apparatus of claim 1, wherein
the phase change material comprises diphenylmethane, monobenzyltoluene, or dibenzyltoluene.

5. The dehydrogenation reaction apparatus of claim 1, wherein
the heating device is an electric heater.

6. The dehydrogenation reaction apparatus of claim 1, wherein
the heating device is a gas combustion apparatus.

7. The dehydrogenation reaction apparatus of claim 1, wherein the dehydrogenation reactor comprises:
an inlet through which the liquid organic hydrogen carrier is configured to inflow, and
an outlet through which the liquid organic hydrogen carrier dehydrogenated in the dehydrogenation reactor is configured to be exhausted.

8. The dehydrogenation reaction apparatus of claim 1, wherein
the dehydrogenation reactor and the heating device are disposed in series.

9. The dehydrogenation reaction apparatus of claim 1, wherein
the heating device and the dehydrogenation reactor are disposed in parallel in a vertical direction.

10. The dehydrogenation reaction apparatus of claim 9, wherein:
the dehydrogenation reactor has a U-shape,
an inlet through which the liquid organic hydrogen carrier is configured to inflow is positioned on a first side of the U-shaped dehydrogenation reactor, and
an outlet through which dehydrogenated liquid organic hydrogen carriers are configured to be exhausted is positioned on a second side of the U-shaped dehydrogenation reactor.

11. The dehydrogenation reaction apparatus of claim 10, wherein
the heating device has a shape corresponding to the dehydrogenation reactor.

12. The dehydrogenation reaction apparatus of claim 1, wherein:
the heating device is disposed in a center of the main housing,
the dehydrogenation reactor is disposed to surround the heating device with a central housing interposed therebetween,
the catalyst is provided between the main housing and the central housing, and
the phase change material is provided between the heating device and the central housing.

13. The dehydrogenation reaction apparatus of claim 12, wherein:
an inlet through which the liquid organic hydrogen carrier is configured to inflow is positioned on a first side of the main housing, and an outlet through which the liquid organic hydrogen carrier dehydrogenated in the dehydrogenation reactor is configured to be exhausted is positioned on a second side of the main housing.

14. The dehydrogenation reaction apparatus of claim 1, wherein:
the dehydrogenation reactor includes a first dehydrogenation reactor and a second dehydrogenation reactor,
the heating device and the first dehydrogenation reactor having the catalyst inside are disposed in series,
the second dehydrogenation reactor is disposed to surround the heating device and the first dehydrogenation reactor with a central housing interposed therebetween,
a catalyst is provided between the main housing and the central housing, and
the phase change material is provided between the central housing, the heating device, and the first dehydrogenation reactor.

15. The dehydrogenation reaction apparatus of claim 14, wherein:
a first inlet through which the liquid organic hydrogen carrier is configured to inflow is positioned on a first side of the main housing,
a first outlet through which the liquid organic hydrogen carrier dehydrogenated in the second dehydrogenation reactor is configured to be exhausted is positioned on a second side of the main housing,
a second inlet, through which the liquid organic hydrogen carrier is configured to inflow, is positioned in the first dehydrogenation reactor, and
a second outlet, through which the liquid organic hydrogen carrier dehydrogenated in the first dehydrogenation reactor is configured to be exhausted, is positioned in the first dehydrogenation reactor.

16. A dehydrogenation reaction system comprising:
a dehydrogenation reaction apparatus comprising: a main housing; a dehydrogenation reactor provided inside the main housing and including a catalyst, the dehydrogenation reactor configured to generate hydrogen from a liquid organic hydrogen carrier (LOHC); and a heating device provided inside of the main housing and configured to apply heat to the dehydrogenation reactor through a phase change material, wherein the phase change material is provided between the main housing, the dehydrogenation reactor and the heating device;
a preheater for preheating the liquid organic hydrogen carrier supplied to the dehydrogenation reaction apparatus; and
a gas-liquid separator that separates the hydrogen produced in the dehydrogenation reaction apparatus and the liquid organic hydrogen carrier.

17. The dehydrogenation reaction system of claim 16, wherein
the gas-liquid separator includes:
a chiller configured to cool the dehydrogenated liquid organic hydrogen carrier; and
a liquid tank configured to store the liquid organic hydrogen carrier cooled by the chiller.

18. The dehydrogenation reaction system of claim 16, further comprising
a buffer tank installed downstream of the gas-liquid separator and configured to store hydrogen gas separated by the gas-liquid separator.

* * * * *